(12) United States Patent
Tomasko

(10) Patent No.: US 10,975,977 B2
(45) Date of Patent: Apr. 13, 2021

(54) PRESSURE RELIEF MODULE

(71) Applicant: BS&B INNOVATIONS LIMITED, Limerick (IE)

(72) Inventor: John Tomasko, Limerick (IE)

(73) Assignee: BS&B Innovations Limited, Limerick (IE)

( * ) Notice: Subject to any disclaimer, the term of this patent is extended or adjusted under 35 U.S.C. 154(b) by 0 days.

(21) Appl. No.: 16/329,001

(22) PCT Filed: Aug. 29, 2017

(86) PCT No.: PCT/IB2017/001185
§ 371 (c)(1),
(2) Date: Feb. 27, 2019

(87) PCT Pub. No.: WO2018/042250
PCT Pub. Date: Mar. 8, 2018

(65) Prior Publication Data
US 2019/0203845 A1 Jul. 4, 2019

Related U.S. Application Data

(60) Provisional application No. 62/380,858, filed on Aug. 29, 2016, provisional application No. 62/380,866, (Continued)

(51) Int. Cl.
*F16K 17/16* (2006.01)
*F16K 17/22* (2006.01)
*F16K 17/28* (2006.01)

(52) U.S. Cl.
CPC ...... *F16K 17/1606* (2013.01); *F16K 17/1626* (2013.01); *F16K 17/22* (2013.01); *F16K 17/28* (2013.01)

(58) Field of Classification Search
CPC .. F16K 17/1606; F16K 17/1626; F16K 17/22; F16K 17/28
(Continued)

(56) References Cited

U.S. PATENT DOCUMENTS 1,485,913 A * 3/1924 Gottlieb ................ F25B 49/005
137/68.22
2,194,159 A * 3/1940 Bonyun ............... F16K 17/1606
220/89.2

(Continued)

FOREIGN PATENT DOCUMENTS

GB 2091808 A * 8/1982 ........... F16K 17/162

*Primary Examiner* — Minh Q Le
(74) *Attorney, Agent, or Firm* — Finnegan, Henderson, Farabow, Garrett & Dunner, LLP

(57) ABSTRACT

A pressure relief module, such as a rupture disk module or a burst panel module, is disclosed. A pressure relief module may comprise a first membrane (10) configured to seal an opening of a contained system and configured to burst open when a pressure in the contained system reaches a predetermined burst pressure. A second membrane (20) may be joined to the first membrane to form a membrane interspace (30) with the first membrane. The membrane interspace (30) may be configured to prevent a backpressure in the contained system from changing the burst pressure required to burst open the first membrane (10). A pressure relief module may provide advantages for a low-pressure enclosure and/or to provide temperature stability and/or backpressure stability.

16 Claims, 8 Drawing Sheets

Related U.S. Application Data filed on Aug. 29, 2016, provisional application No. 62/380,845, filed on Aug. 29, 2016.

(58) Field of Classification Search
USPC ......... 137/68.26, 68.19, 68.27, 68.29, 68.28, 137/68.25, 68.23
See application file for complete search history.

(56) References Cited

U.S. PATENT DOCUMENTS

| | | | | |
|---|---|---|---|---|
| 2,387,353 A * | 10/1945 | Gwynne | ................ | F16K 17/16 220/89.2 |
| 2,788,794 A * | 4/1957 | Holinger | ................ | F16K 17/16 137/71 |
| 2,895,492 A * | 7/1959 | Bell | ................ | F16K 17/16 137/68.22 |
| 3,092,286 A * | 6/1963 | Duff | ................ | F16K 13/06 220/261 |
| 3,612,345 A * | 10/1971 | Fike, Jr. | ................ | F16K 17/1606 220/89.2 |
| 4,085,764 A * | 4/1978 | Raidl, Jr. | ................ | F16K 17/16 137/312 |
| 4,263,929 A * | 4/1981 | Kearney | ................ | F16K 17/16 137/557 |
| 4,347,942 A * | 9/1982 | Jernberg | ................ | F17C 13/06 137/68.27 |
| 4,777,974 A * | 10/1988 | Swift | ................ | F16K 17/162 137/14 |
| 4,951,697 A * | 8/1990 | Fritts | ................ | F16K 17/1606 116/266 |
| 4,978,947 A * | 12/1990 | Finnegan | ................ | F16K 17/1606 340/611 |
| 5,155,471 A * | 10/1992 | Ellis | ................ | F16K 17/16 116/266 |
| 5,167,337 A * | 12/1992 | Short, III | ................ | F16K 17/1606 137/68.21 |
| 5,934,308 A * | 8/1999 | Farwell | ................ | F16K 17/16 137/68.26 |
| 6,178,983 B1 * | 1/2001 | Culliinane | ................ | F16K 17/1606 137/68.26 |
| 6,604,541 B1 * | 8/2003 | Denning | ................ | F16K 17/162 137/492.5 |
| 7,878,215 B2 * | 2/2011 | McLelland | ................ | F16K 13/06 137/68.26 |
| 2015/0300513 A1 * | 10/2015 | Smets | ................ | F16K 17/16 137/68.25 |

* cited by examiner

PRESSURE RELIEF MODULE

TECHNICAL FIELD

This disclosure generally relates to a pressure relief module, such as a rupture disk module, or a burst panel module. More specifically, this disclosure relates to a pressure relief module providing improved stability under back-pressure, providing improved stability under temperature variations, and/or for use with a normally low-pressure enclosure, such as may house a battery.

BACKGROUND

Pressure relief devices are commonly used as safety devices in systems containing pressurized fluids in gas or liquid form, or in contained systems containing volatile (e.g., flammable) conditions that may lead to a potentially dangerous increase in pressure. A pressure relief device will vent fluid from a system when the pressure in the system reaches a predetermined level—usually before it reaches an unsafe level. One category of pressure relief device—a membrane pressure relief device—includes, e.g., rupture disks and burst panels, also known as explosion vents.

Pressure relief devices may come in any number of materials and shapes. Pressure relief devices are commonly manufactured from metal; however, they may be made from polycarbonate sheeting, woven fabric, elastomers, or a combination of materials. A pressure relief device may be rectangular, round, trapezoidal, triangular, or any custom shape desired to fit a given application.

One membrane-type pressure relief device, a rupture disk, may be used to relieve pressure from a pressurized system in response to a potentially dangerous overpressure situation. Generally, a rupture disk has a flange that is sealed between a pair of support members, or safety heads, forming a pressure relief assembly. The pressure relief assembly may then be clamped or otherwise sealingly disposed between a pair of conventional pipe flanges or between a pair of threaded fittings, or attached to one such threaded fitting, in the pressurized system, or through the use of mechanical fittings such as those designed for dairy use or by the biotechnology industry which use a clamp external to the specialty flange arrangement. The pressure relief assembly may be installed using such techniques as welding, soldering, crimping or mechanical clamping to hold the sandwich of components together. A first pipe conducts pressurized fluid to one side of the pressure relief assembly, and a second pipe provides an outlet to a safety reservoir or may be open to the environment. The support members include central openings that expose a portion of the rupture disk to the pressurized fluid in the system. The exposed portion of the rupture disk will rupture when the pressure of the fluid reaches a predetermined differential pressure between the inlet and outlet sides. The ruptured disk creates a vent path that allows fluid to escape through the outlet to reduce the pressure in the system.

A rupture disk may also be used to relieve pressure from a system without being placed between two pipe flanges. For example, a pressurized system may have an outlet member or opening through which fluid may be vented or released—e.g., into the environment or a container. A rupture disk may be installed at such an outlet member or opening to control the pressure at which fluid may be released. For example, a rupture disk may be welded to an outlet member or welded to cover an outlet opening. Additionally or alternatively, a rupture disk may be attached to a pressurized system's outlet by clamping, bolting, riveting, or any other suitable mechanism.

A rupture disk typically has a dome-shaped, rounded-shaped, conical shape, truncated conical shape, or other generally curved rupturable portion and can be either forward-acting or reverse-acting. A forward-acting rupture disk is positioned with the concave side of the rupturable portion exposed to the pressurized system, placing the disk under tension. Thus, when an over-pressure condition is reached—i.e., when the system pressure exceeds a safe or desirable level—the rupture disk may relieve pressure by bursting outward. Conversely, a reverse-acting rupture disk (also known as a reverse buckling rupture disk) is positioned with its convex side exposed to the pressurized system, placing the material of the disk under compression. Thus, when an over-pressure condition is reached, the rupture disk may buckle and reverse—i.e., invert—and tear away to vent pressurized fluid. Further rupture disk technology may be flat and respond in a tension loaded manner.

A reverse buckling rupture disk may rupture by itself upon reversal. Alternatively, additional features may be provided to facilitate rupture. For example, physical features, such as score lines and shear lines (and other areas of weakness, also known as lines of weakness), may be used to facilitate opening of a rupture disk and control the opening pattern of a rupture disk. In a reverse buckling disk, for example, the disk will tear along a score line when the disk is reversing. Selected portions of the disk may be left unscored, acting as a hinge area, to prevent the disk from fragmenting upon bursting and the fragments from the disk escaping along with fluid from the pressurized system. A central portion of the disk that is partially torn away from the rest of the disk may be referred to as a "petal."

Other features may be provided to facilitate the rupture of a reverse buckling, tension loaded or flat rupture disk, such as a cutting structure or stress concentration point that may contact the rupture disk upon reaching its activation pressure, ensuring that rupture occurs. Exemplary cutting structures include one or more blades (e.g., a four-part blade like that provided by BS&B Safety Systems as part of the commercially available RB-90™ reverse buckling disk, or a tri-shaped three-part blade like that provided by BS&B Safety Systems as part of the commercially available DKB VAC-SAF™ rupture disk) and circular toothed rings (e.g., like that provided by BS&B Safety Systems as part of the commercially available JRS™ rupture disk). Other exemplary cutting structures may be positioned along the periphery of a rupturable portion. Still other exemplary cutting structures may be positioned in an X-shape, Y-shape, or irregular Y-shape designed to engage with the rupturable portion upon reversal.

When a rupture disk opens, it may create a risk of fragmentation—i.e., a risk that one or more portions of the opened disk (petals) will tear away and be carried downstream along with a released fluid. Fragmentation may be controlled through the use of a hinge located downstream of a rupture disk.

A rupture disk is disclosed in co-owned U.S. patent application Ser. No. 12/923,622, filed Sep. 29, 2010, by John Tomasko, Paul Goggin, and Geof Brazier, and titled RUPTURE DISK, the disclosure of which is hereby expressly incorporated herein by reference. A rupture disk is also disclosed in co-owned Patent Cooperation Treaty Application No. PCT/US10/50779, filed Sep. 29, 2010, by John Tomasko, Paul Goggin, and Geof Brazier, titled RUPTURE DISK, and published as PCT Pub. No. WO/2011/041456, the disclosure of which is hereby expressly incorporated herein by reference. Rupture disk assemblies using cutting structures are described in co-owned U.S. Pat. Nos. 4,236,648 and 5,082,133, the contents of which are hereby expressly incorporated by reference in their entirety. Exemplary stress concentration points are described in co-owned U.S. Pat. No. 5,934,308, the contents of which are hereby expressly incorporated by reference in their entirety.

The predetermined pressure differential at which a rupture disk will rupture or activate is known as the "burst pressure" or the "activation pressure." The burst pressure for which a rupture disk is rated is known as the "nominal burst pressure." The burst pressure may be set by way of the rupture disk's physical parameters, such as material thickness and dome height (also known as "crown height"). The burst pressure also may be set using various physical features, such as indentations. A rupture disk having an indentation—and methods of manufacturing such rupture disks—is disclosed, for example, in co-owned U.S. Pat. Nos. 6,178,983, 6,321,582, 6,446,653, and 6,494,074, the contents of which are hereby incorporated by reference in their entirety.

Like a rupture disk, a burst panel also may be used to relieve pressure from a system. For example, a burst panel may be installed on an opening through which fluid may be vented or released—e.g., into the environment or a container. A burst panel may control the pressure at which fluid may be released from the system. For example, a burst panel may be welded to an outlet member or welded to cover an outlet opening. Additionally or alternatively, a burst panel may be attached to a pressurized system's outlet by clamping, bolting, riveting, adhesively bonding, or any other suitable mechanism.

Many of the principles of a rupture disk, discussed above, also can be applied or adapted to a burst panel. For example, a burst panel may come in any number of suitable materials, including metal and non-metal materials. A burst panel can take a number of shapes—e.g., rectangular, round, irregular—depending on the desired application. A burst panel may exhibit a domed, rounded, conical, truncated-conical, or other generally curved opening portion and can be either forward-acting or reverse-acting. In addition, a burst panel may be flat. A burst panel may be provided with physical features, hinges, cutting structures, lines of weakness, perforations through the material, and other features described above in connection with rupture disks to control or modify the pressure at which the burst panel will open (i.e., the "opening pressure" or "activation pressure") and/or the characteristics that the burst panel will exhibit upon opening.

The activation pressure of a known pressure relief device is typically impacted by the pressure differential between the upstream side of the device (e.g., the pressurized system) and the downstream side of the device (e.g., the container or other environment into which fluid will vent upon activation of the pressure relief device). In other words, an increased backpressure or downstream pressure exhibited on the device will reduce the pressure differential across the device, thereby increasing the amount of pressure within the contained system that will be required to activate the device. Conversely, a decreased backpressure or downstream pressure will increase the pressure differential across the device, thereby decreasing the amount of pressure within the contained system required to activate the device.

The impact of backpressure on a pressure relief device may be undesirable. For example, a pressurized container rated to operate safely at up to 1000 kPa may be provided with a rupture disk having a burst pressure of 900 kPa, such that the rupture disk will open well before the container's maximum safe pressure is reached. If, however, the rupture disk is subjected to a back pressure (e.g., a back pressure of 200 kPa), then the rupture disk may not open until the container's pressure exceeds safety limits (e.g., 1100 kPa). There is a need for a mechanism to improve the backpressure stability of such devices.

As another example of the undesirable impact of backpressure, a relatively low-pressure sealed enclosure may be provided with a burst panel configured to activate and relieve pressure at a very low relative pressure, such as 50 kPa. In the case of a lithium-ion battery, for example, slight pressure increases may indicate an unsafe chemical reaction within the battery that could lead to dangerous pressure buildup and, ultimately, an explosion. The battery's burst panel is designed to prevent such pressure buildup. If the enclosure is sealed, however, the pressure differential acting on the burst panel may vary widely depending on the environmental ambient pressure. For example, ambient pressure at sea level is approximately 101 kPa, whereas ambient pressure at an elevation of 10 km is only about 26 kPa. As a result, a burst panel configured to activate at 50 kPa relative pressure at sea level may activate simply due to a change in air pressure (e.g., in an airplane ascending toward 10 km), even though conditions within the enclosure do not necessitate venting. There is a need for a mechanism to improve the backpressure stability of such devices.

Damage to a pressure relief device may compromise the device's integrity and change its activation pressure. Such damage may come from mechanical impact (e.g., collision with an object external to the device), exposure to harsh chemicals, or other sources. There is a need for a mechanism to protect a pressure relief device from such external damage. The need for such a mechanism is particularly strong in the case of a pressure relief device having a low activation pressure, because such devices may be especially sensitive.

As noted above, physical features—such as indentations—may be used to set or contribute to the activation pressure of a pressure relief device. Such features, however, may not be effective to change the activation pressure of certain kinds, of devices. In the case of a forward-acting (i.e., tension loaded) rupture disk, for example, the disk's activation pressure is strongly governed by the disk's mechanical attributes (e.g., material, thickness, and diameter), and the role of surface features (e.g., indentations) is negligible. As a result, if a user is unable to obtain a wide range of disk thicknesses for a given material and diameter, the user may be left with few options to set the disk's burst pressure. Thus, there is a need for an additional mechanism to adjust the activation pressure of a pressure relief device.

The performance of a pressure relief device may depend on its temperature. For example, the burst pressure of a rupture disk tends to decrease when used at higher temperatures and increase when used at lower temperatures. That phenomenon gives rise to the concept of a "Temperature Correction Factor" ("TCF"), which is defined as the ratio of a device's burst pressure at an elevated temperature to the device's burst pressure at an ambient temperature of 20° C. For one exemplary type of pressure relief device manufactured from stainless steel, the expected TCF decreases generally linearly with respect to temperature, as indicated in the following chart.

| | Temp ° C. | | | | | | | | | | | |
|---|---|---|---|---|---|---|---|---|---|---|---|---|
| | 20 | 40 | 60 | 80 | 100 | 120 | 140 | 160 | 180 | 200 | 220 | 240 |
| TCF | 1.00 | 0.99 | 0.98 | 0.97 | 0.96 | 0.95 | 0.94 | 0.93 | 0.92 | 0.90 | 0.89 | 0.88 |

At lower temperatures, below 20° C. the TCF is expected to increase above 1.00.

There is a need for a mechanism to improve the temperature stability of a pressure relief device, i.e., a mechanism to reduce the variation in TCF across a range of temperatures.

The pressure relief module of the present disclosure fulfills one or more of the foregoing needs, or other needs, or achieves other advantages or features.

BRIEF DESCRIPTION OF THE DRAWINGS

The accompanying drawings, which are incorporated in and constitute a part of this specification, illustrate several embodiments and together with the description, serve to explain the aspects of the disclosure.

DESCRIPTION OF THE EMBODIMENTS

Reference will now be made in detail to the present exemplary embodiments, examples of which are illustrated in the accompanying drawings.

Figure 1:
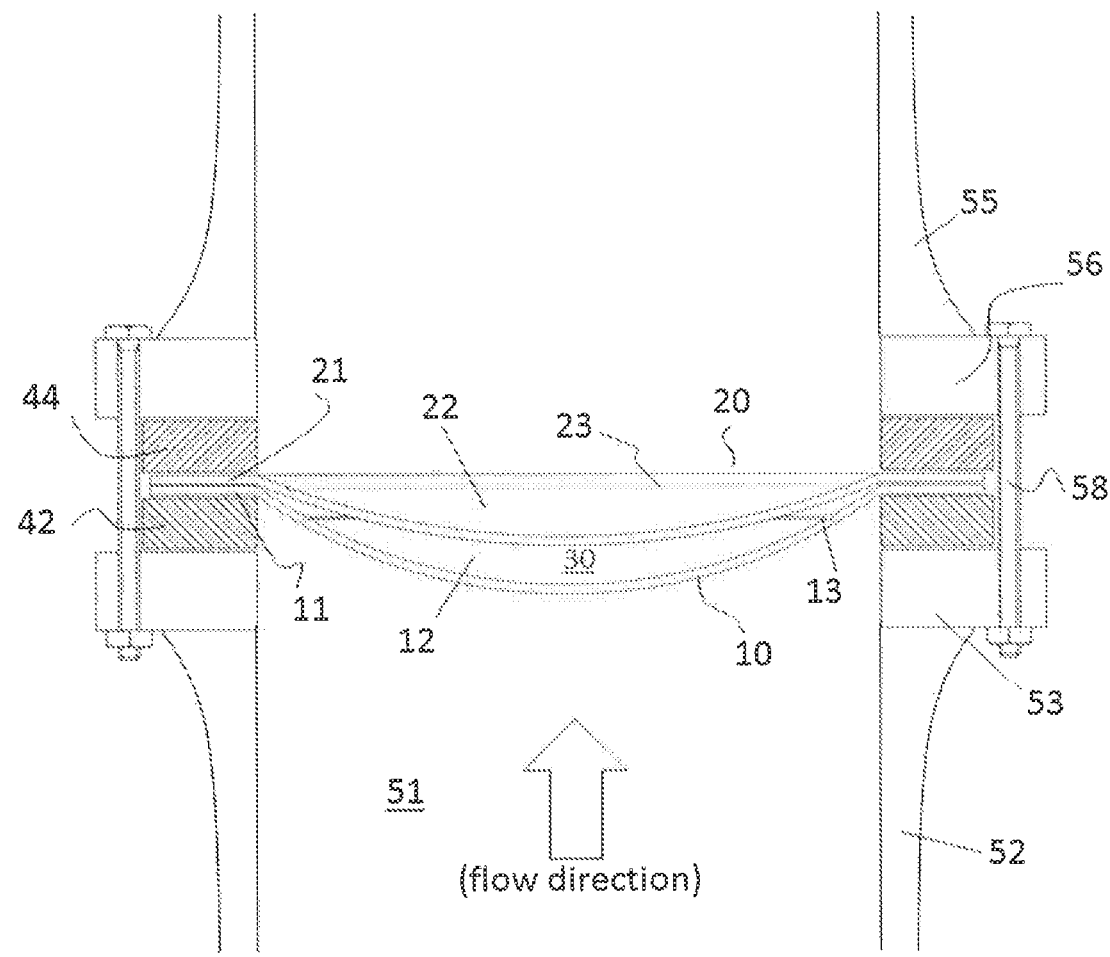
FIG. 1 is a cross-sectional view of a pressure relief module using a reverse-acting membrane.

FIG. 1 depicts an exemplary pressure relief module. According to the example of FIG. 1, a pressure relief module may include a primary membrane 10, and a secondary barrier membrane 20. The primary membrane 10 is provided with a flange portion 11 and an activation portion 12. The barrier membrane 20 is provided with a flange portion 21 and an activation portion 22. As illustrated, the primary membrane 10 and barrier membrane 20 are joined together at their flange portions 11, 21, thereby forming a membrane interspace 30 between the activation portions 12, 22.

In the example shown in FIG. 1, the membrane interspace 30 is formed due to the different crown heights of the activation portions 12, 22 of the two membranes. In other words, the primary membrane 10 has a higher crown height than the barrier membrane 20, which causes formation of the membrane interspace 30 between them.

In one embodiment, as illustrated in FIG. 1, the primary membrane 10 may be an inlet membrane or process-side membrane, which is exposed to a controlled volume 51. As illustrated in FIG. 1, the controlled volume 51 may be the inner bore of an inlet pipe 52, which may be in fluid connection with a container or other controlled volume. The container may be normally pressurized, or may contain a volatile process (e.g., flammable dust or other flammable materials, chemical processes) capable of generating heat and/or pressure. In such an embodiment, the barrier membrane 20 may be an outlet membrane, which is exposed to the environment or an outlet system 54. As illustrated in FIG. 1, the outlet system 54 is the inner bore of an outlet pipe 55.

As illustrated in FIG. 1, the flange portions 11, 21 of the primary and barrier membranes 10, 20 of the pressure relief module are held within a holder mechanism—sometimes referred to as a "safety head"—that includes an inlet head 42 and an outlet head 44. The safety head may facilitate mounting the pressure relief module within the system. As shown, for example, the safety head may align the pressure relief module between the inlet and outlet pipes 52, 55 and may be clamped between the inlet pipe flange 53 and outlet pipe flange 56 by way of one or more flange bolts 58. It is also contemplated, however, that a pressure relief module may be mounted within a system—including between two pipe flanges—directly and without the use of a safety head. It also is contemplated that a pressure relief module and safety head assembly may be provided as an integral module. Whether provided with or without a safety head assembly, one embodiment of a pressure relief module may be shipped to a customer or end-user in a pre-assembled unit, which may facilitate correct orientation and installation of the module into an existing system. The module also may be provided with features to ensure correct installation, such as locating holes to facilitate proper alignment within an existing system and/or to prevent improper or unsafe configurations.

In one embodiment, the membrane interspace 30 may be a sealed volume, such that the primary and barrier membrane flange portions 11, 21 form a fluid-tight seal between them. A fluid-tight seal between the flange portions 11, 21 may be achieved by any suitable mechanism, including, e.g., continuous welding, adhesives, or epoxies or the clamping arrangement provided by the safety head. A fluid-tight seal between the flange portions 11, 21 may also be achieved by way of a mechanical mechanism, such as a clamp. It is contemplated that a gasket or O-ring (not illustrated in FIG. 1) may be provided between the flange portions 11, 21 to aid in creating a fluid-tight seal. It is also contemplated that one or both of the flange portions 11, 21 may be provided with surface features (e.g., ridges) to aid in creating a fluid-tight seal. Such surface features may be mated (e.g., corresponding tongues and grooves on the mated surfaces of the flange portions). Such surface features also may include sharp features configured to "bite" into the material of the corresponding flange portion, thereby creating a "bite seal" between them.

In the pressure relief module illustrated in FIG. 1, the primary membrane 10 is configured to activate (i.e., open) in response to an overpressure condition in the controlled volume 51. More specifically, the primary membrane 10 is configured to reverse and rupture, or burst, when it is exposed to a predetermined pressure differential. The burst pressure of the primary membrane 10 may be set based on the membrane's material, thickness, or physical dimensions (e.g., diameter, thickness, crown height, crown shape). The burst pressure of the primary membrane 10 also may be set based on physical features imposed on the membrane, including indentations, score lines, shear lines, etched lines, machined lines, or areas or lines of weakness. In addition, the primary membrane 10 may include features to control the shape and size of its opening when it activates. As illustrated in FIG. 1, the primary membrane 10 is provided with a score line 23, which defines a line on which the primary membrane will open when it activates. The score line 23 may form a straight line, a circle, a partial circle, or any other suitable shape. When the score line 23 forms a partial circle or other partial shape, it may leave an unscored portion between its end points. That unscored portion may act as a hinge to prevent the opened membrane material (also known as a "petal") from separating completely from the rest of the primary membrane 10. It also is contemplated that multiple score lines (e.g., an "X" shape) may be provided.

Figure 2:
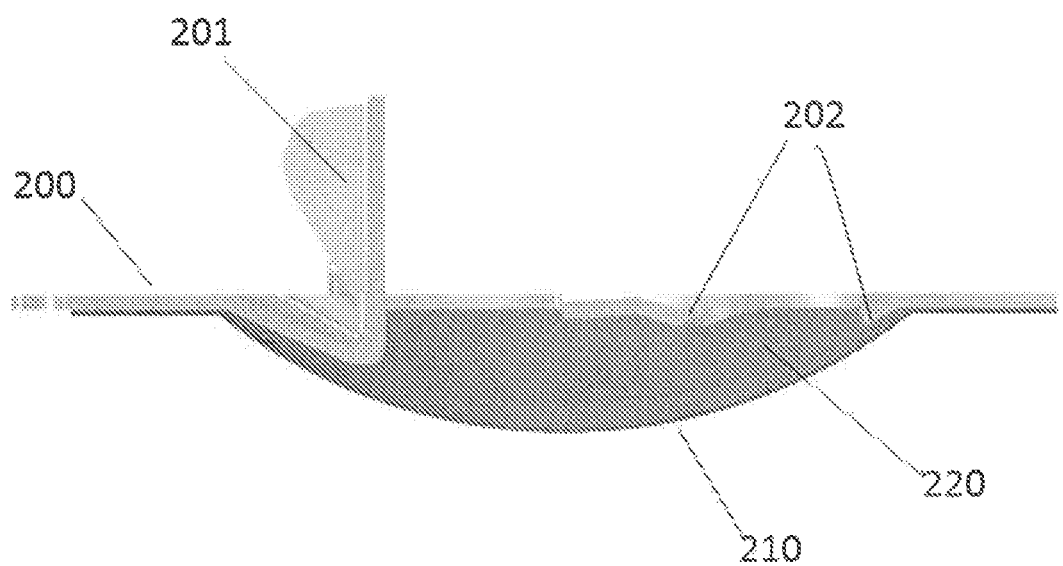
FIG. 2 is a cross-sectional view of a pressure relief module including a hinge member.

Other features may be provided to control the opening of the membranes. For example, as illustrated in FIG. 2, a hinge member 200 may be provided downstream of a pressure relief module. In FIG. 2, a pressure relief module includes a primary membrane 210 and barrier membrane 220. Hinge member 200 includes a tongue 201, which may be configured to catch a petal of the primary membrane 210 and/or barrier membrane 220 after the membrane(s) open. In this manner, the hinge member 200 and tongue 201 may prevent the petal(s) from tearing away completely. A hinge member 200 also may be provided with one or more cutting elements or stress concentration points 202, which may be configured to impinge upon the barrier membrane 220 as the barrier membrane 220 reverses, thereby causing the barrier membrane 220 to open.

Returning to FIG. 1, because the primary membrane 10 is configured to activate in response to a pressure differential, the control pressure (i.e., pressure within controlled volume 51) at which the primary membrane 10 will activate will change if the primary membrane 10 is subjected to backpressure (i.e., a positive pressure tending to counteract a positive pressure in the control volume 51).

The barrier membrane 20 may be configured to insulate the primary membrane 10 against the effect of a backpressure from the environment or outlet system 54. For example, in one embodiment, the outlet system 54 may be a contained system subject to variable pressures. The outlet system 54 may, for example, be located in an area outdoors and/or exposed to sunlight. An increase in ambient temperature, or exposure to sunlight, may increase the temperature and pressure of the outlet system 54. In some instances, the backpressure of the outlet system 54 may vary by between 5% and 15%. The presence of the barrier membrane 20 may eliminate or at least greatly diminish the extent to which the increased pressure of the outlet system 54 can act as a backpressure on primary membrane 10. As a result, the pressure of the controlled volume 51 at which the primary membrane 10 will rupture will remain substantially unchanged. Accordingly, the pressure relief module may enhance the reliability and/or safety of the system, as compared to a known pressure relief device without a barrier membrane.

The barrier membrane 20 may be configured to open at a relatively lower pressure than the primary membrane 10. In one embodiment, the burst pressure of the barrier membrane 20 may be 30% to 50% of the burst pressure of the primary membrane 10. Thus, in the event that the primary membrane 10 reverses and/or activates, the barrier membrane 20 also will activate to allow fluid to escape through openings in both of the primary and barrier membranes. Similarly to the primary membrane 10, the barrier membrane 20 may include features to control when and how it will open. As illustrated in FIG. 1, for example, the barrier membrane 20 may include a score line 23 or other line of weakness or area of weakness to control the location and shape of the opening of the barrier membrane. Such areas of weakness may be created by, e.g., chemical etching.

In one embodiment, the barrier membrane 20 may include structural features, such as indentations, to control the activation pressure and/or the point at which reversal of the barrier membrane 20 will activate. In one embodiment, the barrier membrane 20 may be configured to act directly as a hinge and/or tongue member (similar to the separate hinge/tongue member illustrated in FIG. 2) to catch the petal of the primary membrane 10 following activation. For example, the barrier membrane may be configured to remain rigid in the center even after the outer portions of the barrier membrane have opened. In such an embodiment, the rigid portion of the barrier membrane may catch the petal of the primary membrane following activation.

Additionally or alternatively, the barrier membrane 20 may be configured to divert or redirect the flow of an escaping fluid after activation of the pressure relief module. In one embodiment, the barrier membrane 20 may have an opening off-center from the opening of the primary membrane 10, such that the membranes do not have a common axis of flow, which may cause an escaping fluid to bend around the second membrane 20. Redirecting the flow of an escaping fluid may be desirable to increase the safety of a pressure relief module. For example, an escaping fluid may be redirected toward the ground and/or away from nearby people.

The improved backpressure stability achieved using principles of the present disclosure has been verified through testing. In tests, a known reverse-acting rupture disk—a 2-inch-diameter, 0.008-inch-thick (approximately 50.8-mm-diameter and 0.2-mm-thick) SKr disk manufactured by BS&B Safety Systems—was mounted on a 1800 cubic-inch (29.5 L) pressurized tank and observed to rupture at a nominal burst pressure of 80 psig (552 kPa). For comparison, a pressure relief module was tested on the same 1800 cubic-inch pressurized tank. The module included a combination of two reverse-acting rupture disks, stacked to form a membrane volume therebetween. The first rupture disk of the module (i.e., the process-side membrane exposed to pressures within the tank) was a 0.008-inch-thick SKr disk having a crown height of 0.45 inches (approximately 11.4 mm). The second rupture disk of the module (i.e., the vent-side or outlet-side membrane exposed to backpressures) was a 0.004-inch-thick SKr disk having a crown height of 0.35 inches (approximately 8.9 mm). Alone, the 0.008-inch-thick SKr disk is rated for an 80 psig activation pressure, and the 0.004-inch-thick SKr disk is rated for a 12.5 psig activation pressure. When tested as a single combined pressure relief module, the module was observed to rupture at a nominal burst pressure of 81 psig (558 kPa). The module was observed to maintain its nominal burst pressure of 81 psig even when subject to backpressures of 15 psig or 30 psig (103 kPa or 207 kPa). A traditional rupture disk with nominal burst pressure of 81 psig would have required burst pressures of 96 psig and 111 psig (662 kPa and 765 kPa), respectively, before bursting under such backpressure conditions. Thus, as demonstrated by the testing results, the principles of the present disclosure may provide improved backpressure stability.

It is contemplated that the membrane interspace 30 may be modified to improve the performance of the pressure relief module. For example, the membrane interspace 30 may be provided with an initial pressure (or initial vacuum) to affect the operation of the primary membrane 10 and/or barrier membrane 20, and/or in view of the expected operating conditions of the pressure relief module. The membrane interspace 30 may be filled with a material to achieve a desired performance. For example, the membrane interspace 30 may be filled with a noble gas or a non-flammable gas to avoid creating a chemical reaction or combustion in the event that the membrane interspace 30 is opened to the controlled volume 51 or the environment or outlet volume 54. As another example, the membrane interspace 30 may be filled with a particular substance (e.g., liquid, gas, foam, or mixture thereof) to achieve a desired result, including vibration resistance, temperature resistance, combustion resistance, and temperature-pressure profile.

It is further contemplated that additional structure may be positioned within the membrane interspace 30. In one embodiment, a cutting member or stress concentration point may be positioned within the membrane interspace 30 to aid in the opening of the primary membrane 10 in response to an overpressure condition. In another embodiment, a sensor may be positioned within the membrane interspace 30, to sense a temperature, pressure, or other attribute or operating condition therein. Such a sensor may be used to satisfy a code-driven alarm activity or safety response. Such a sensor may be used to monitor the integrity of the pressure relief module. Such a sensor may, for example, detect whether the primary membrane 10 or barrier membrane 20 has developed a leak and needs to be replaced. Such a sensor also may be used to send a signal in the event that the pressure relief module activates. That signal may be used, e.g., to generate an alarm or trigger a protective measure (e.g., releasing a flame extinguishant into the path of an escaping fluid). Co-owned U.S. Pat. No. 7,168,333—the entire contents of which are hereby incorporated by reference in their entirety—discloses devices, systems, and methods for using a sensor to monitor a condition within a volume. It is contemplated that principles of U.S. Pat. No. 7,168,333 may be combined with the present disclosure, including in relation to the conditions within the membrane interspace 30.

In another embodiment, the conditions within the membrane interspace 30 may be modified during operation. The membrane interspace 30 may be provided with a fluid supply source, which may be used to increase a pressure within the membrane interspace 30, as desired. For example, the fluid supply source may inject a fluid into the membrane interspace 30 to counteract a pressure in the control volume 51 and/or exit volume 54, to prevent either or both of the primary membrane 10 and barrier membrane 20 from opening. Specifically, it may be the case that, despite an overpressure in the control volume 51, conditions in the exit volume 54 may be too unsafe to allow the control volume 51 to evacuate pressure. If a spark or an ignition source were detected in the exit volume 54, for example, then it may be undesirable to evacuate material from the control volume 51 that might combust upon contact with the spark or ignition source. To prevent such contact, the membrane interspace 30 may be pressurized with additional fluid to prevent the primary membrane 10 from reversing and rupturing until it is safe to do so.

As another example, it is contemplated that the pressure within a membrane interspace 30 may be decreased to achieve a desired performance. Decreasing the pressuring in the membrane interspace 30 may, for example, reduce the system pressure (in control volume 51) that is required to activate the primary membrane 10. In this manner, the pressure relief module may operate predictively or prophylactically. In one example, a sensor in the control volume 51 may detect an impending overpressure situation (for example, due to an ignition event) and cause a reduction in pressure in the membrane interspace 30 to facilitate rupture of the primary membrane 10 at a lower system pressure. By manipulating the conditions within the membrane interspace 30, a controlled response to an overpressure situation or other condition can be achieved. Manipulating the conditions within the membrane interspace 30 may, for example, change the responsiveness of the pressure relief module, change the backpressure stability of the module, and/or change the temperature stability of the module.

In a further embodiment, one or more membranes 10, 20 of a pressure relief module may be configured to respond to certain conditions by bursting or by exhibiting a change in its ability to resist back pressure. For example, if one or more membranes 10, 20 is damaged or is subjected to a change in its shape, then the membrane may respond, e.g., by bursting at a lower pressure or by exhibiting less resistance to backpressure. Such a configuration may provide a fail-safe feature to a pressure relief module.

A membrane used in a pressure relief module may be made of any suitable material, and a primary membrane 10 may be made of a different material from the barrier membrane 20. The material may be selected to achieve a particular performance (e.g., burst pressure) or based on the application or environment (e.g., hot or corrosive processes). Suitable materials for one or more of the membranes 10, 20 may include, e.g., metal, ceramic, plastic, glass, or paper. In one embodiment, a high-performance, high-cost material may be selected for the primary, process-side membrane, such as Hastelloy, Tantalum, or titanium. A lower-cost material may be selected for the secondary, vent-side membrane, such as stainless steel or plastic.

Figure 3:
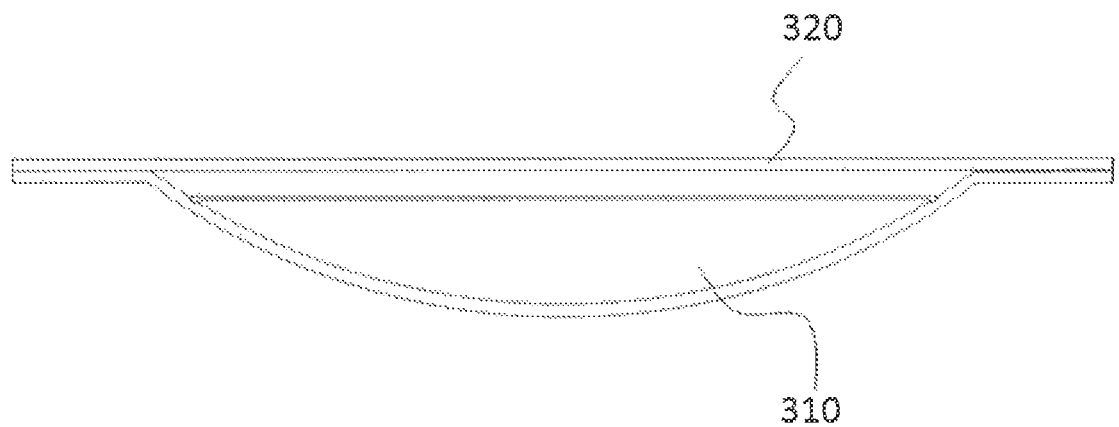
FIG. 3 is a cross-sectional view of another embodiment of a pressure relief module including a flat membrane.
Figure 4:
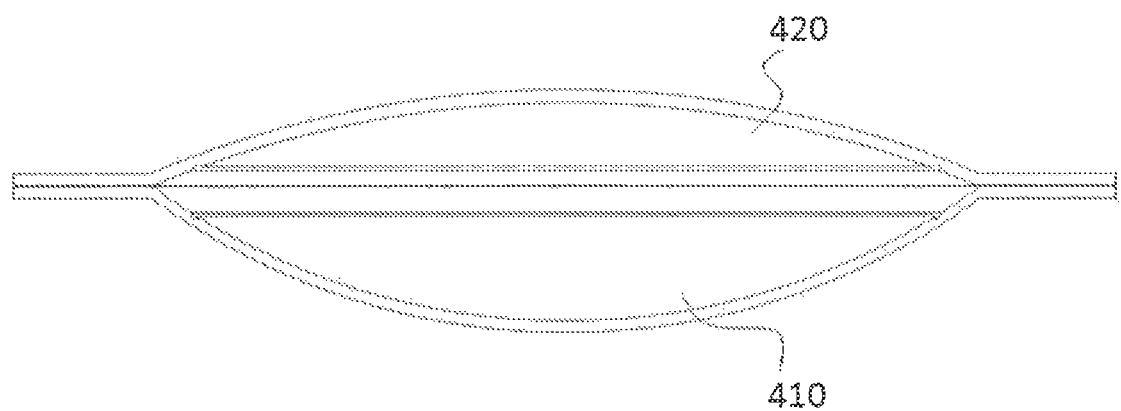
FIG. 4 is a cross-sectional view of another embodiment of a pressure relief module including two round membranes.

Although a pressure relief module has been described in connection with FIG. 1 as including a combination of two reverse-acting membrane-type pressure relief devices, the disclosure is not limited to that configuration. As illustrated in FIG. 3, for example, a primary membrane 310 may be curved (e.g., a reverse-acting rupture disk) while a barrier membrane 320 may be substantially flat. Moreover, it is contemplated that a primary (process-side) membrane may be flat while a secondary (vent-side or outlet-side) membrane is curved. As shown in FIG. 4, a primary membrane 410 may be a reverse-acting rupture disk, while the barrier membrane 420 may be curved in the opposite direction (e.g., curved in the forward-acting direction). The shape of the membranes may be selected to achieve a desired performance or appearance. In one embodiment, it may be desired for the barrier membrane to have a low external profile (e.g., a flat or concave profile) to reduce visibility and/or to leave room or other external components.

Figure 5A:
FIGS. 5A-5C illustrate embodiments of membranes that may be used in embodiments of a pressure relief module.
Figure 5B:
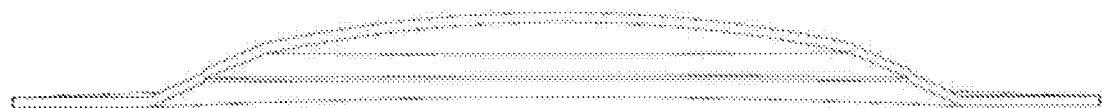
Figure 5C:
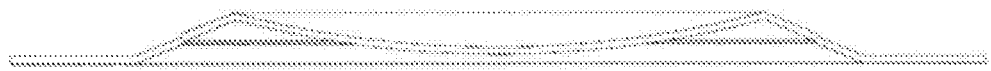
Figure 6A:
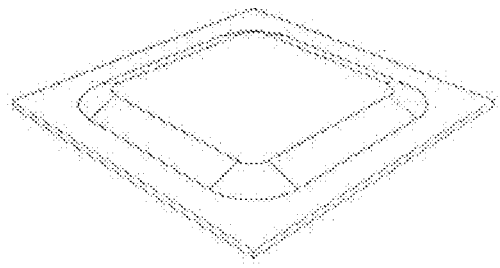
FIGS. 6A-6D illustrate further embodiments of membranes that may be used in embodiments of a pressure relief module.
Figure 6B:
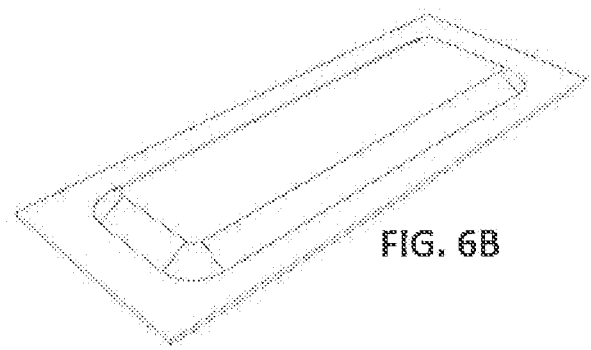
Figure 6C:
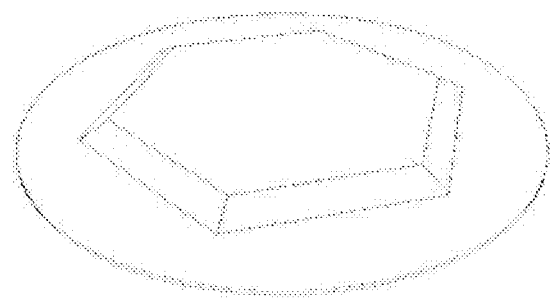
Figure 6D:
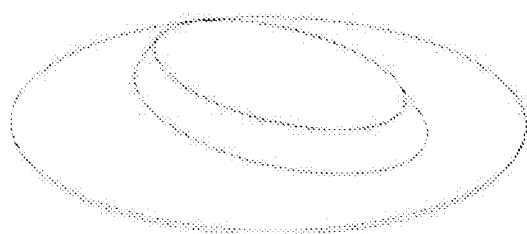

Although a pressure relief module has been described in connection with FIG. 1 as including dome-shaped pressure-relief device(s), other shapes of pressure-relief devices are also contemplated. For example, a first and/or second pressure relief device in a module may take the shape of frustum (i.e., a "pie-pan" shape) as illustrated in FIG. 5A, a compound dome having multiple radii of curvature as illustrated in FIG. 5B, or a compound inverted dome as illustrated in FIG. 5C.

Although a pressure relief module has been described in connection with FIG. 1 generally in terms of circular rupture-disk-type membranes, the disclosure is not so limited. It is contemplated that one or more of a primary and barrier membrane may take a non-circular shape, such as illustrated in FIGS. 6A-6D.

In one embodiment, a membrane interspace may not be fully sealed. For example, the barrier membrane (e.g., element 20 in FIG. 1) may be vented or otherwise made permeable to the outlet environment (e.g., element 54 in FIG. 1). Gas permeability may be provided by, e.g., a bleed valve or a gas-permeable material such as Gore-Tex. Providing such a vent or permeability in the barrier membrane may prevent the membrane interspace 30 from impacting the burst pressure of the primary membrane (e.g., element 10 in FIG. 1), while still protecting the primary membrane against impact, corrosion, or other potentially damaging interactions from the outlet side. In the case that the membrane interspace is not fully sealed, the primary and barrier membrane may be joined together via a discontinuous joint (e.g., discontinuous orbital welding along the membrane flanges).

Figure 7:
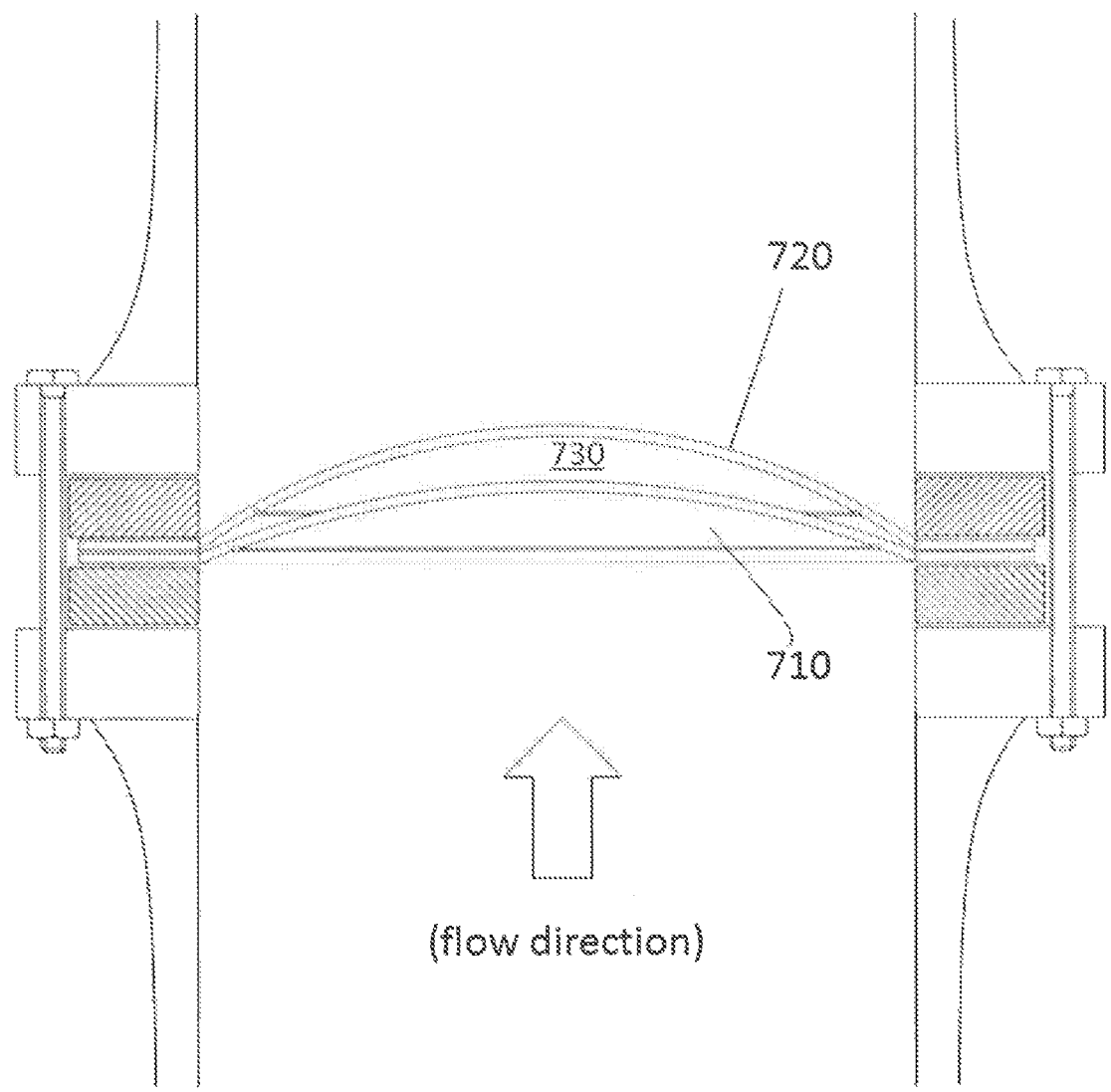
FIG. 7 is a cross-sectional view of another embodiment of a pressure relief module using a forward-acting membrane.

A pressure relief module alternatively may use a forward-acting (i.e., tension-loaded) inlet membrane 710, an outlet membrane 720, and a membrane interspace 730 therebetween, such as illustrated in FIG. 7. As noted above, the activation pressure of a forward-acting inlet membrane is substantially unaffected by surface features such as indentations; therefore, setting a precise response pressure of a forward-acting inlet membrane may be particularly challenging. As such, controlling the conditions of the membrane interspace 730 (e.g., pressure, temperature) may be particularly useful as a means to manipulate the activation pressure of the pressure relief module in a forward-acting embodiment such as in FIG. 7.

A pressure relief module may be configured to fit within pre-existing pipe flanges and pre-existing safety head members, allowing easy replacement of existing pressure relief devices with the new and improved modules of the present disclosure.

A pressure relief module may be certified by one or more standard-setting organizations or certification organizations as a single unit. Known pressure relief devices (e.g., rupture disks and burst panels) typically have been certified or rated separately, meaning that a theoretical combination of two such devices (e.g., two rupture disks) would necessitate two separate certifications or ratings. The art has generally avoided combining two such separately certified devices to avoid the risk that the operation of one device could interfere with the intended operation of the other device and unpredictably alter the other device's pressure ratings. The present disclosure solves that problem by providing a combination of two or more membrane-type pressure relief devices, certified or rated as a single unit.

In one embodiment, a pressure relief module may be configured to provide improved stability in response to temperature variations. The activation pressure of a known membrane-type pressure relief device may be significantly impacted by the temperature of the device. For example, a rupture disk operating in a system at 20° C. may be expected to activate at a much higher pressure than if the same disk were operating in a system at 240° C. Conversely, a rupture disk operating in a system at 20° C. may be expected to activate at a much lower pressure than if the same disk were operating in a system at −50° C. As a result, known membrane-type pressure relief devices may be limited in terms of the ranges of temperatures to which they may be exposed without a change in activation pressure that impacts application design. In addition, known membrane-type pressure relief devices may exhibit undesirable performance in the face of an unexpected change in operating temperature.

A pressure relief module according to the present disclosure—e.g., the module depicted in FIG. 1—may be configured to decrease the impact of temperature variations on activation pressure. According to the configuration in exemplary FIG. 1, a temperature increase that might otherwise weaken the primary membrane 10 (i.e., reduce its burst pressure) will simultaneously increase the pressure within the membrane interspace 30. As a result, the membrane interspace pressure reinforces and strengthens the primary membrane 10, thereby counteracting the tendency of increased temperature to weaken the primary membrane 10. In this manner, the pressure relief module may exhibit less variation in burst pressure across a range of temperatures, as compared to a known membrane-type pressure relief device.

The improved temperature stability achieved using principles of the present disclosure has been verified through testing, results of which are summarized in the chart below. The chart below presents a Temperature Correction Factor ("TCF") and observed burst pressure of a known reverse-acting rupture disk ("RD"), along with the observed burst pressure of a pressure relief module ("RM") at various temperatures. The chart also presents the change in pressure ("ΔP") observed in the membrane interspace between the two membranes of the RM.

| Temp ° C. | TCF | RD (psig) | RM (psig) | ΔP (atm) | ΔP (psig) |
| --- | --- | --- | --- | --- | --- |
| 20 | 1.00 | 79.72 | 81.12 | 0 | 0 |
| 40 | 0.99 | 78.74 | 81.12 | 0.068224 | 1.003 |
| 60 | 0.98 | 77.93 | 81.3 | 0.136449 | 2.005 |
| 80 | 0.97 | 77.11 | 81.47 | 0.204673 | 3.008 |
| 100 | 0.96 | 76.29 | 81.64 | 0.272898 | 4.01 |
| 120 | 0.95 | 75.47 | 81.81 | 0.341122 | 5.013 |
| 140 | 0.94 | 74.64 | 81.96 | 0.409347 | 6.016 |
| 160 | 0.93 | 73.8 | 82.12 | 0.477571 | 7.018 |
| 180 | 0.92 | 72.96 | 82.26 | 0.545796 | 8.021 |
| 200 | 0.90 | 72.11 | 82.4 | 0.61402 | 9.024 |
| 220 | 0.89 | 71.26 | 82.54 | 0.682245 | 10.026 |
| 240 | 0.88 | 70.41 | 82.67 | 0.750469 | 11.029 |

As shown in the chart, a known reverse-acting rupture disk observed to activate at 79.72 psig at 20° C. will activate at 70.41 psig when the temperature is raised to 240° C. That burst pressure change of −9.31 psig over a range of 220° C. corresponds to a TCF of 0.88. In other words, at 240° C., the rupture disk would be expected to activate at pressure only 88% of the disk's nominal rated pressure at 20° C.

In comparison, the pressure relief module exhibited no decrease in burst pressure as temperature increased to 240° C. Instead, the burst pressure slightly increased (by 1.55 psig) due to the increase in pressure (ΔP) within the membrane interspace, resulting in a TCF of 1.02. Thus, as demonstrated by the testing results presented above, the principles of the present disclosure may provide improved temperature stability.

Although the temperature stability of a pressure relief module is described above in terms of stability through increased temperatures, the present disclosure also contemplates improved temperature stability through decreased temperatures. For example, as the temperature of a membrane decreases, its burst pressure tends to increase. At the same time, however, the pressure within a membrane interspace decreases. That reduced pressure tends to counteract the corresponding increase in burst pressure, thereby maintaining a TCF closer to 1.0 and improving temperature stability.

TCF is a function of material of construction; therefore, the performance of a pressure relief module can be tailored according to the materials of construction of at least one of its components. Pressure relief device users often prefer stainless-steel construction because of the material's wide ranging chemical resistance and relative economy. The TCF of known stainless steel rupture disks is typically large. The pressure relief module and rupture disk data presented above is for stainless steel material. Thus, principles of the present disclosure have been shown to provide significant benefits to users requiring stainless-steel constructions.

It is contemplated that the performance of a pressure relief module—including its pressure stability—may be modified or adjusted in several ways. For example, the volume of the membrane interspace may adjusted, e.g., by adjusting the relative crown heights of the constituent membranes. As another example, one or more surface features (e.g., indents), lines of weakness, areas of weakness, or other features may be provided in one or more of the constituent membranes. As another example, the membrane interspace of a pressure relief module may be filled with a liquid, gas, foam, and/or other material to achieve a desired pressure response (e.g., the filling material(s) may be selected to alter the $\Delta P$ observed within the membrane interspace in response to changing temperatures). Similarly, the initial pressure within the membrane interspace may be modified to achieve a desired pressure response (e.g., the membrane interspace may form a partial vacuum, which may reduce the magnitude of $\Delta P$ observed within the membrane interspace in response to changing temperatures).

A further embodiment of the disclosure involves the selective interaction between the at least two membranes comprising the pressure relief module—e.g., arising from contact between their surfaces that are exposed to inlet or outlet pressure. Such contact may be reinforcing, in which case nominal burst pressure may be increased. In another embodiment, such contact may be weakening, in which case nominal burst pressure may be reduced. Selective and controlled contact of surfaces can provide a valuable additional mechanism to calibrate the activation pressure of a pressure relief device. It is further contemplated that surface features may be provided to one or more of the at least two membranes to achieve a desired performance when the membranes come into contact. It also is contemplated that additional structure may be placed between the at least two membranes, such that the two membranes interact with one another indirectly via the additional structure.

According to another embodiment of the disclosure, a pressure relief module may be used with a normally low-pressure enclosure. One example of a normally low-pressure enclosure may be a battery, such as a lithium-ion battery pack. A known normally low-pressure enclosure may be provided with a pressure relief device having a low activation pressure. In some instances, the activation pressure may be within the range of about 3 psi to 10 psi (about 20 kPa to 70 kPa). Typically, a pressure relief device having such a low activation pressure may be fragile and easily damaged, whether by mechanical means (e.g., impact) or exposure to harsh environments (e.g., water or corrosive chemicals). The present disclosure contemplates providing protection to a low-activation-pressure relief device by using a barrier membrane or cover. Temporary impact such as that of water spray, water submersion, or rocks and stones modifies at least temporarily the activation pressure of the relief device by inducing a mechanical back pressure which is undesirable for the overall safety of the low-pressure enclosure.

Figure 8:
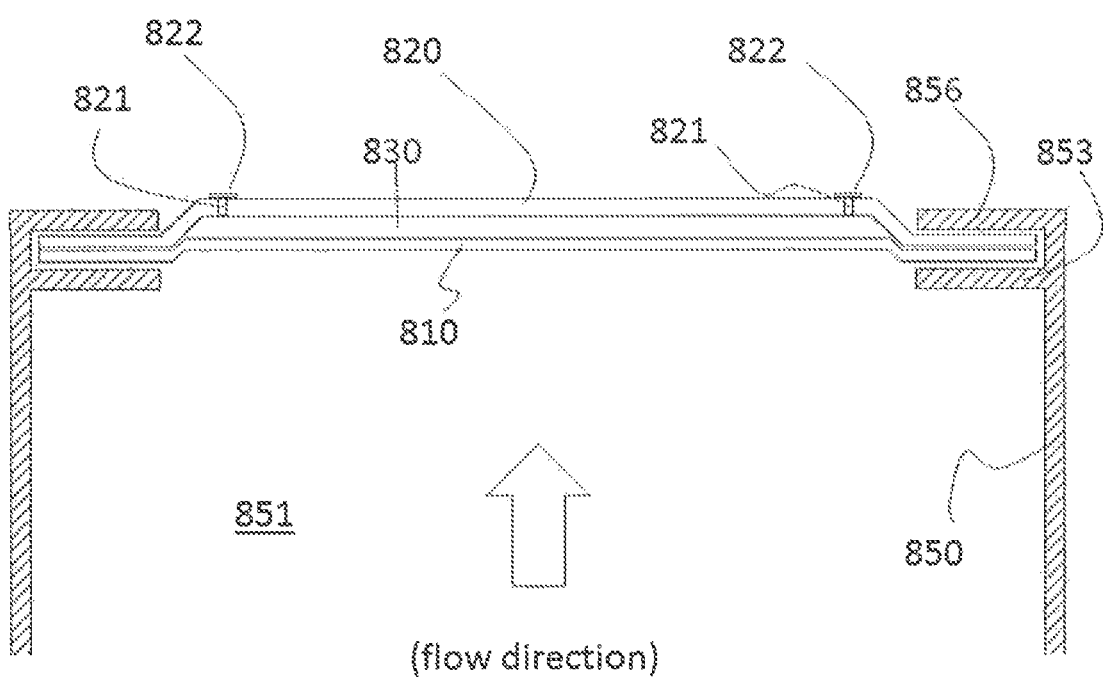
FIG. 8 is a cross-sectional view of yet another embodiment of a pressure relief module used with a normally low-pressure enclosure.

An embodiment of a low-pressure relief module including a barrier membrane or cover is illustrated in FIG. 8. As shown, a pressure relief module is provided with a primary membrane 810 and a barrier membrane 820, which form a membrane interspace 830 therebetween. The membranes 810 and 820 may be joined together using mechanisms similar to those described above in connection with membranes 10 and 20 of FIG. 1 (e.g., welding, adhesives, clamping, and/or gaskets). The pressure relief module may be mounted to cover an outlet of an enclosure 850. As illustrated in FIG. 8, the pressure relief module is held between flanges 853, 856; however, a pressure relief module may be mounted on an enclosure without flanges. For example, a pressure relief module may be adhered, welded, riveted, or otherwise joined directly to the surface of an enclosure, or mounted to the enclosure in another suitable manner.

In the embodiment of FIG. 8, the primary membrane 810 is configured to activate or open in response to a predetermined pressure within the controlled volume 851 of the enclosure. The barrier membrane 820 is configured to activate or open at a lower activation pressure than the primary membrane 810. For example, if the enclosure is rated safe at pressures up to 5 psi, the primary membrane 810 may be configured to activate or open in response to a pressure of 4 psi or 5 psi, and the barrier membrane 820 may be configured to activate in response to a pressure of 3 psi or 4 psi. In this manner, when primary membrane 810 activates, the secondary membrane 820 also will be expected to activate.

In one embodiment, the membrane interspace 830 may be configured to achieve increased backpressure stability and/or temperature stability as described above in connection with the embodiment illustrated in FIG. 1. Additionally or alternatively, a condition within the membrane interspace 830 may be sensed and/or controlled, to monitor or modify module performance, as described above in connection with the embodiment illustrated in FIG. 1.

Backpressure stability may be particularly important for a low-pressure relief module when used in connection with a sealed, normally low-pressure enclosure, such as a battery. A known low-pressure enclosure may need to vent pressure through a known pressure relief device at a relatively low pressure differential, such as 2 psi (14 kPa). Ambient pressures, however, may vary widely due to such factors as elevation. For example, ambient pressure at sea level is approximately 101 kPa, whereas ambient pressure at an elevation of 10 km is only about 26 kPa. As a result, a relief device configured to activate at 14 kPa relative pressure at sea level may activate simply due to a change in air pressure (e.g., in an airplane ascending toward 10 km), even though conditions within the enclosure do not necessitate venting. The backpressure stability provided by a module as depicted in FIG. 8 (and FIG. 1) may add robustness and permit wider ranges of uses (e.g., at various elevations) for sealed low-pressure enclosures.

The barrier membrane 820 in FIG. 8 may be configured to protect the primary membrane 810 from damage. For example, the barrier membrane 820 may protect against mechanical impact from the outer environment. Additionally or alternatively, the barrier membrane 820 may protect against exposure to dangerous or corrosive elements, such as water or corrosive chemicals. The barrier membrane 820 may be gas-tight, thereby creating a completely sealed membrane interspace 830 and allowing the interspace 830 to have a different pressure relative to the ambient environment. Alternatively, the barrier membrane 820 may be gas-permeable, or provided with a gas-permeable portion (e.g., a bleed valve or gas-permeable fabric portion such as Gore-Tex), such that the barrier membrane 820 may permit the membrane interspace 830 to remain at an equal pressure with the ambient environment, while keeping out potentially harmful materials such as water, chemicals, dust, etc. In one embodiment, the barrier membrane 820 may be perforated with one or more perforations 821, which may extend partially or completely through the thickness of the barrier membrane 820. Perforations 821 may be used to facilitate or control the manner in which the barrier membrane 820 can open. Other features—such as the indentations, lines of weakness, and areas of weakness described above—also may be provided to facilitate or control the manner in which the barrier membrane 820 can open. Perforations 821 may be sealed with a seal 822. The seal 822 may be gas-tight and/or liquid-tight. In one embodiment, the seal 822 may be a silicone bead. In another embodiment, the seal 822 may be a breathable fabric, such as Gore-Tex.

Although not illustrated in FIG. 8, a hinge or retaining mechanism may be provided to keep the primary membrane 810 and/or barrier membrane 820 attached to the container after activation.

Any suitable material may be selected for the primary membrane 810 and barrier membrane 820. For example, the primary membrane 810 may be formed of metal to achieve a predictable pressure response, whereas the barrier membrane 820 may be formed of a plastic to achieve a desired protection against impact and/or exposure to dangerous or corrosive materials.

In one embodiment, a pressure relief module, such as illustrated in FIG. 8, may meet International Electrotechnical Commission (IEC) standards, such as the International Protection Marking or Ingress Protection Marking (IP) 60529 standards for protection against intrusion by objects, dust, or water. For example, a pressure relief module may be configured to meet IP67 standards or IP68 standards for protection against dust and water ingress. A pressure relief module may be configured to meet such standards where, for example, it is used with an electrical enclosure such as a battery enclosure.

Where a pressure relief module is used with an enclosure containing flammable materials or processes, it may be desirable to incorporate a flame arrestor with the pressure relief module, to prevent or reduce a flame emerging from the enclosure when the pressure relief module activates. A flame arrestor may take the form of a mesh or honeycomb, which may be made of metal, ceramic, plastic, or other suitable material.

In one embodiment of a low-pressure relief module, such as illustrated in FIG. 8, the low-pressure relief module may be configured for operation within a particular temperature range. For example, the module may be configured for operation at temperatures between −40° C. to +75° C.

Although certain embodiments of a pressure relief module have been described above as acting passively in response to an overpressure situation, the disclosure is not limited to such embodiments. It is contemplated, for example, that a pressure relief module may be opened using an actuator (e.g., active actuation), such as a gas generator, pyrotechnic actuator, or a solenoid-driven mechanical impact device. When combined with an actuator, a pressure relief module may provide a controlled or "on-demand" release of pressure. An actuator may be controlled using a controller and/or in response to a signal from a sensor. For example, if a potentially dangerous situation is detected (such as a spark or a sudden rise in pressure), a signal may be sent to cause the actuator to open the pressure relief module to allow pressure to escape the system.

It is contemplated that individual features of one embodiment may be added to, or substituted for, individual features of another embodiment. Accordingly, it is within the scope of this disclosure to cover embodiments resulting from substitution and replacement of different features between different embodiments.

The above described embodiments and arrangements are intended only to be exemplary of contemplated apparatus and methods. Other embodiments will be apparent to those skilled in the art from consideration of the specification and practice of the disclosure herein. It is intended that the specification and examples be considered as exemplary only.

What is claimed is:

1. A pressure relief module, comprising:
    a primary membrane; and
    a secondary membrane;
    wherein the primary membrane has a set pressure, wherein the primary membrane is configured to seal an opening of a contained system;
    wherein the primary membrane is configured to burst open when a pressure in the contained system reaches the set pressure;
    wherein the secondary membrane is joined to the primary membrane to form a membrane interspace between the primary and secondary membrane;
    wherein the second membrane is exposed to a backpressure; and
    wherein the membrane interspace is sealed and pressurized, and wherein the pressure within the membrane interspace is configured to maintain the set pressure of the primary membrane in response to an increase in temperature of the primary membrane throughout a predetermined range of operating temperatures.

2. The pressure relief module of claim 1, wherein the set pressure of the primary membrane is a first burst pressure, wherein the secondary membrane has a second burst pressure, and wherein the second burst pressure is less than the first burst pressure.

3. The pressure relief module of claim 1, further comprising:
    a hinge member, wherein the secondary membrane is positioned between the primary membrane and the hinge member.

4. The pressure relief module of claim 1, wherein the primary membrane has a flange and the secondary membrane has a flange; the module further comprising:
    an inlet safety head positioned adjacent to the flange of the primary membrane; and
    an outlet safety head positioned adjacent to the flange of the secondary membrane;
    wherein the inlet safety head and outlet safety head are configured to retain the primary membrane and secondary membrane between them.

5. The pressure relief module of claim 4, further comprising:
    a safety head arrangement;
    wherein a seal between the primary and secondary membrane is achieved when clamped within the safety head arrangement.

6. The pressure relief module of claim 1, further comprising:
    a sensor positioned within the membrane interspace, the sensor being configured to sense an operating condition within the membrane interspace.

7. The pressure relief module of claim 1, further comprising:
   a mechanism to control the pressure within the membrane interspace.

8. The pressure relief module of claim 1, wherein the membrane interspace contains a fluid.

9. The pressure relief module of claim 8, wherein the fluid is a liquid.

10. The pressure relief module of claim 1, wherein the membrane interspace contains a foam.

11. The pressure relief module of claim 1, further comprising:
   an inlet pipe having an opening; and
   an outlet pipe having an opening;
   wherein the primary membrane and secondary membrane form a fluid tight seal between the opening of the inlet pipe and the opening of the outlet pipe;
   wherein the primary membrane is configured to burst open in response to a set pressure within the inlet pipe; and
   wherein the secondary membrane is configured to prevent a change in backpressure up to a predetermined level within the outlet pipe from changing the set pressure of the pressure relief module.

12. The pressure relief module of claim 11, wherein the predetermined level of backpressure is up to about 40% of the set pressure of the primary membrane.

13. The pressure relief module of claim 1, wherein the predetermined range of operating temperatures is within the range of 20° C. and 240° C.

14. The pressure relief module of claim 1, wherein the membrane interspace increases the backpressure stability of the primary membrane.

15. The pressure relief module of claim 1, wherein the secondary membrane forms an IP67 or IP68 seal between the primary membrane and the external environment.

16. The pressure relief system of claim 1, wherein the secondary membrane is configured to protect the primary membrane against impact from objects in the external environment.

* * * * *